Feb. 20, 1934.  A. F. WELCH  1,948,084
CLUTCH
Filed March 18, 1933
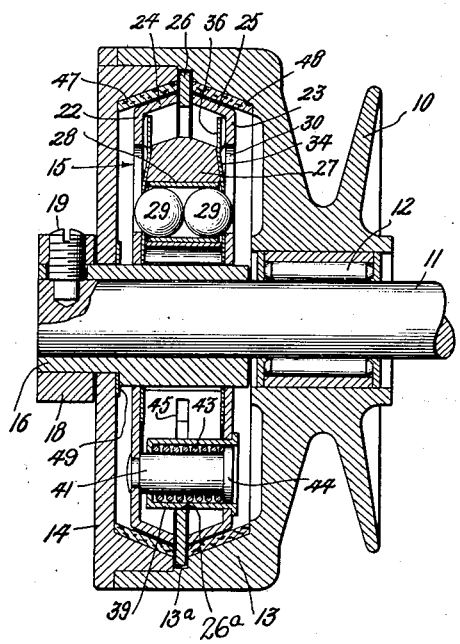
Inventor:
Alfred F. Welch,
by Charles E. Mullen
His Attorney.

Patented Feb. 20, 1934

1,948,084

UNITED STATES PATENT OFFICE 1,948,084

CLUTCH

Alfred F. Welch, Fort Wayne, Ind., assignor to General Electric Company, a corporation of New York Application March 18, 1933. Serial No. 661,515

19 Claims. (Cl. 192—105)

My invention relates to centrifugally actuated clutches and centrifugally actuated mechanisms.

Clutches provided with centrifugally actuated mechanisms are commonly incorporated within a motor casing, or within a pulley or transmission coupling. Difficulty has been experienced in providing clutches for this purpose of a construction such that the operation of the clutch is uniform, and at the same time of a construction which is simple, rugged and easily manufactured.

It is an object of my invention to provide an improved centrifugally actuated mechanism for clutches of the above type of a rugged and simple construction, which can be easily manufactured.

A further object of my invention is to provide a clutch of the foregoing type which shall be uniform in operation.

Further objects and advantages of my invention will become apparent as the following description proceeds and the features of novelty which characterize my invention will be pointed out with particularity in the claims annexed to and forming a part of this specification.

In the accompanying drawing Fig. 1 is a longitudinal sectional view of a clutch embodying my invention arranged within a driving pulley; Fig. 2 is a side elevation of the structure shown in Fig. 1 partly broken away more clearly to show the construction; and Fig. 3 is a perspective view of the several parts of the centrifugally actuated mechanism shown in Fig. 1 separated and arranged in the order of their assembly.

Referring to the drawing, in Fig. 1, I have shown my invention as embodied in a combined clutch and pulley, and arranged to connect a driven pulley 10 to a driving shaft 11. The pulley 10 is rotatably mounted on the shaft 11 on roller bearings 12. A cup-shaped member 13 is formed integrally with the pulley 10, having a flanged cover 14 forming a closed housing in which is arranged a centrifugally actuated clutch operating mechanism 15 for connecting the pulley 10 to the shaft 11. A sleeve 16 is provided with splines 17 and arranged within the housing for driving the centrifugally actuated mechanism, and the sleeve is secured in place on the shaft 11 by a collar 18 and a set screw 19. The cup-shaped member 13 is tightly fitted on the flange of the cover 14 to provide a drive or press fit, and the cup-shaped member is provided with notches 20 which engage the projections 21 on the cover 14 for preventing relative rotation of these parts.

The centrifugally actuated mechanism for connecting the shaft 11 to the pulley 10, after the shaft has attained a predetermined speed, comprises a pair of plates or discs 22 and 23 provided with conical flanges 24 and 25, respectively, and mounted on the sleeve 16 and splines 17 with the conical flanges extending toward a supporting plate 26, which serves as a radial guide and spacer for a plurality of centrifugally actuated weights 27. The periphery of the plate 26 extends into an annular groove 13a formed between the cup-shaped member 13 and the cover 14, so as to retain the conical flanges 24 and 25 in the desired relation to the clutch faces; when the clutch is disengaged, the periphery of the plate is rotatable in the groove 13a. The cross section of the upper portion of these weights, as viewed in Fig. 1 is wedge-shaped. Each of the weights is provided with a transverse bore fitted with a hard metal bushing or guide 28 and within this bushing is arranged a pair of interengaging steel balls 29. The sum of the diameters of these balls is greater than the width of the weights 27 and hence the balls extend partially beyond the sides of the weights into the openings or recesses 30 provided in the plates 22 and 23. Between the weights and the plates 22 and 23, I provide substantially flat springs 31 and 32, respectively, which prevent outward movement of the weights 27 until the driving shaft 11 has attained a predetermined speed, and which then release the balls 29 and permit them to ride up on the springs with a snap action or sudden movement. The springs 31 and 32 are provided with three arms arranged to engage each of the three weights 27. These arms are provided with portions 33 and 34, respectively, which are bent to conform to the wedge-shaped portion of the weights 27, and are also provided with arched circumferentially extending portions 35 and 36, respectively, which maintain firm contact between the arms 33 and 34 and the balls carried by the weights throughout their outward movement. These arched portions 35 and 36 also resiliently support the ends of the arms out of contact with the discs 22 and 23. Both of the springs 31 and 32 are provided with openings or recesses 37 in their three arms, in which the balls 29 are seated when the weights are in their retracted position, as shown in Fig. 1, the edges of the openings acting as shoulders restraining outward movement of the weights. The line of flexure of the spring arms is determined by straight edges 30a of the recesses 30 in the discs 22 and 23. The plates 22 and 23 and the springs 31 and 32 are provided with notches engaging the splines 17 to secure the centrifugally actuated mechanism for rotation with the shaft 11, but to permit axial movement of the several parts thereof. The several parts of the centrifugal mechanism are held together by three spring assemblies 38. These spring assemblies comprise sleeves 39 secured in openings 40 in the plate 23, and studs 41 fitted within the sleeves 39 and riveted in openings 42 in the plate 22. Helical compression springs 43 are held under compression between the bottoms of the sleeves 39 and the heads 44 of the studs 41. It will be noted that the weights are provided with slots 45 and that they engage radial guides 46 of the plate 26 and are limited in their outward movement by the outer rim 46a. The springs 31 and 32 and the discs 23 and 24 are all keyed to the shaft 16 by splines 17, and since the spring assembly sleeves 39 fit in openings 26a in the plate 26, all parts of the centrifugal mechanism are prevented from rotating relative to each other about the shaft 16. In the retracted position in which the weights are shown on the drawing, the balls 29 are seated in the openings 37 in the springs 31 and 32, and are retained securely in place under pressure between the springs. The balls are arranged in such position that, with sufficient centrifugal force exerted by the weights, they will urge the plates 22 and 23 apart, and will ride up on the springs 31 and 32 which act as inclined tracks and maintain the balls and weights under pressure as the weights 27 move outwardly. The inside of the clutch housing is provided with conical surfaces corresponding to the surfaces of the flanges 24 and 25 of the plates 22 and 23, and these surfaces have friction faces 47 and 48 respectively. It can be seen that when the plates 22 and 23 are forced apart by the outwardly moving weights, the outer surfaces of these plates will engage the friction surfaces 47 and 48 and will establish a driving connection between the shaft 11 and the pulley 10. Friction between the ends of the splines 17 and the plate 14 is minimized by a washer 49 loosely fitted on the sleeve 16.

In the operation of the embodiment of my invention shown in the drawing, the shaft 11 is brought up to speed by an electric motor or other device, which also accelerates the centrifugally actuated mechanism. When a predetermined speed has been reached, which speed is determined by the design of the elements of the centrifugally actuated mechanism, centrifugal force acting on the weights 27 and the balls 29 causes the balls to snap out of the openings 37 in the springs 31 and 32, and the weights will move suddenly outward with a snap action and will force the plates 22 and 23 into contact with the friction surfaces 47 and 48 of the housing to engage the clutch. As soon as the balls 29 snap out of the openings 37, there is very little resistance to further outward movement of the weights since the springs 31 and 32 serve as tracks for the balls 29 which roll out with very little frictional resistance. Should the load attached to the pulley 10 be sufficiently great it may reduce the speed of the shaft and the mechanism to a speed at which the weight and balls will be forced back to their retracted position by the springs 43 and 31 and 32. If this occurs, the balls 29 will snap into the openings 37 and the cycle will be repeated, the load having been again taken off the motor and the shaft 11, which will again come up to the predetermined speed and actuate the centrifugal mechanism. This repetition of the clutching action, which gives in effect a series of hammer blows on the load, is advantageous since the motor is not required to draw a continuous heavy starting current. The high kinetic energy of the rotating parts of the motor and clutch is thus used to advantage to reduce the current required in starting.

The several parts of this device can be readily made by modern production methods. It is to be noted that great precision is not necessary, since the springs 31, 32 and 43 will adjust themselves in case of irregularities or wear during the operation of the clutch, there being sufficient initial tension on the parts of the centrifugal mechanism to allow for any normal wear of the clutch surfaces. Since there is no lost movement between the balls 29 in their retracted position and the other parts of the mechanism, the operation of the clutch is very uniform.

It is seen from the foregoing that I have provided a compact, simple, self-contained, centrifugally actuated mechanism which may be employed to operate a clutch for connecting an electric motor to its load after the motor has attained a predetermined speed and which will then operate with a snap action to apply the full kinetic energy of the rotating parts to start the load.

Although I have shown my invention as embodied in a clutch applied to a belt pulley and to an electric motor, it is obvious that it may be useful for other purposes. I do not, therefore, desire my invention to be limited to the particular arrangement shown and described, and I intend in the appended claims to cover all modifications which do not depart from the spirit and scope of my invention.

What I claim as new and desire to secure by Letters Patent of the United States, is:

1. A centrifugally actuated mechanism including a ball outwardly movable from a retracted position by centrifugal force, a substantially flat spring having a recess therein, and means for maintaining said ball under pressure in contact with said spring, said ball in its retracted position partially entering the recess in said spring.

2. A centrifugally actuated mechanism including a ball outwardly movable from a retracted position by centrifugal force, a radial guide for said ball, a substantially flat spring having a recess therein, and means for maintaining said ball under pressure in contact with said spring, said ball in its retracted position partially entering the recess in said spring.

3. A centrifugally actuated mechanism including two substantially flat springs each having a recess therein, two balls, one of said balls extending into the recess in one of said springs and in contact with said one spring, and the other of said balls extending into the recess in the other of said springs and in contact with said other spring, said balls being movable by centrifugal force out of said recesses in said springs and outwardly between said springs, and means for limiting the outward movement of said balls.

4. A centrifugally actuated mechanism including an outwardly movable ball, a substantially flat spring adjacent said ball, means including a recess in said spring for delaying outward movement of said ball, and means for maintaining said ball under pressure against said spring throughout the range of outward movement of said ball.

5. A centrifugally actuated mechanism including two substantially flat springs each having a recess therein, a plurality of balls outwardly movable from a retracted position and arranged between said springs, each of said balls partially entering the recess in one of said springs when in its retracted position, and means including two axially movable plates for urging said springs against said balls.

6. A centrifugally actuated mechanism including a weight outwardly movable by centrifugal force, a transverse guide in said weight, a pair of interengaging balls arranged in said guide and extending beyond the sides of said weight, a substantially flat spring arranged on one side of said weight and having a recess adjacent said guide, one of said balls partially entering the recess in said spring, means for maintaining said balls under pressure against said spring, and means limiting the outward movement of said weight.

7. A centrifugally actuated mechanism including a pair of interengaging balls, said balls being outwardly movable from a retracted position by centrifugal force, means including springs having recesses therein on either side of said balls for holding said balls under pressure and for retaining said balls in a retracted position, means including a portion of said springs for maintaining said balls under pressure throughout the outward movement of said balls, and means for limiting the outward movement of said balls.

8. A centrifugally actuated mechanism including a weight outwardly movable by centrifugal force, a transverse guide in said weight, a pair of interengaging balls arranged in said guide and extending beyond each side of said weight, means including substantially flat springs arranged on opposite sides of said weight and having recesses therein engaging said balls for retaining said balls under pressure and for restraining outward movement of said weight, means including portions of said springs for maintaining said balls under pressure throughout the outward movement of said weights, means including discs on either side of said weight and said springs for urging said springs against said weight, and means for limiting the outward movement of said weight.

9. A centrifugally actuated mechanism including a plurality of weights outwardly movable by centrifugal force, transverse guides on said weights, pairs of interengaging balls arranged in said guides and extending beyond the sides of said weights, means including substantially flat springs having recesses therein engaging said balls for maintaining said balls under pressure, means including flanged discs having recesses therein and enclosing said weights and said springs for determining the line of flexure of said springs upon outward movement of said weights, and means for urging said discs together against said springs.

10. A clutch including a driving member and a driven member, centrifugally actuated means for establishing a driving connection between said members, said means including an outwardly movable ball and a substantially flat spring having a recess therein and secured to said driving member, said ball being held under pressure by said spring and extending partially into the recess therein, and means for maintaining said ball in contact with said spring.

11. A clutch including a driving member and a driven member, centrifugally actuated means for establishing a driving connection between said members, said centrifugally actuated means including an outwardly movable ball, and means including a flat spring having a shoulder thereon for restraining outward movement of said ball for maintaining said ball under pressure throughout the range of outward movement thereof.

12. A clutch including a driving member and a driven member, centrifugally actuated means for establishing a driving connection between said members, said means including an outwardly movable weight having a transverse guide therein, a pair of interengaging balls arranged in said guide and extending beyond the side of said weight, flat springs secured to said driving member and arranged on opposite sides of said weight, said springs having recesses therein engaging said balls and being arranged to maintain said balls under pressure throughout the range of outward movement of said weight.

13. A clutch including a driving member and a driven member, centrifugally actuated means for establishing a driving connection between said members, said means including a plurality of outwardly movable weights, a pair of substantially flat springs having recesses therein and arranged on opposite sides of said weights, a pair of axially movable flanged discs enclosing said weights and said springs, pairs of interengaging balls arranged in said weights and extending into the openings in said springs, means for urging said discs together and for maintaining said balls under pressure between said springs throughout the range of outward movement of said weights, and means for securing said discs to rotate with said driving member.

14. A clutch having a driving member and a driven member, centrifugally actuated means for establishing a driving connection between said members, said centrifugally actuated means including a plurality of outwardly movable weights, substantially flat springs arranged on opposite sides of said weights, means including a pair of flanged discs enclosing said weights and said springs for maintaining said springs under pressure, means for limiting the outward movement of said weights, means for securing said flanged discs and said springs for rotation with said driving member, and means including balls arranged in said weights in contact with said springs for forcing said flanged discs apart upon outward movement of said weights to establish a driving connection between said driving and driven members.

15. A clutch including a driven member having a housing provided with an annular groove therein, a driving member arranged in said housing, centrifugally actuated means for engaging said driving and driven members, said centrifugally actuated means including a portion loosely engaging the annular groove in the periphery of said driven member for retaining said centrifugally actuated means in operative relation to said driven member.

16. A clutch including a driven member having a housing, a driving member arranged in said housing, centrifugally actuated means including a pair of axially movable flanged discs and a supporting plate having an outwardly extending portion for engaging said driving and driven members, and means associated with said driven member and rotatably engaging the outwardly extending portion of said supporting plate for supporting said centrifugally actuated means in operative relation to said driven member.

17. A clutch including a driven member having a housing, said housing having an annular groove therein, a driving member arranged in said housing, centrifugally actuated means including a supporting plate rotatably arranged in the annular groove in said housing, said centrifugally actuated means having flanged discs arranged on opposite sides of said supporting plate, and rotatable and outwardly movable weights carried by said supporting plate for forcing said discs into engagement with said driven member.

18. A clutch including a driving member and a driven member, a centrifugally actuated mechanism including a plurality of outwardly movable weights for connecting said members, a guide plate for said weights, a pair of flanged discs enclosing said weights and arranged on opposite sides of said guide plate, means for urging said discs together, substantially flat springs arranged on opposite sides of said weights and between said weights and said discs, pairs of interengaging balls arranged in said weights and extending laterally through said springs, said balls engaging edges of said springs and being held under pressure by said springs throughout the range of outward movement of said weights, said centrifugally actuated mechanism being axially movable on said driving member, said driven member having an annular groove therein, the periphery of said guide plate extending into the groove in said driven member for supporting said centrifugally actuated mechanism in operative relation to said driven member, and means for utilizing the outward movement of said weights to connect said driving and driven member.

19. A clutch including a driving member and a driven member, centrifugally actuated means for establishing a driving connection between said members, said centrifugally actuated means including a pair of flanged discs forming a housing, means for resiliently retaining said discs together, means including a plurality of outwardly movable weights having wedge-shaped portions for urging said discs apart, a pair of flat springs between said discs and said weights, said springs having portions bent to conform to the wedge-shaped portions of said weights, means including pairs of interengaging balls in said weights engaging edges of said flat springs for retaining said weights in a retracted position until said weights have attained a predetermined speed of rotation.

ALFRED F. WELCH.